United States Patent [11] 3,544,116

| [72] | Inventor | Carl R. Peterson |
| | | Princeton, New Jersey |
| [21] | Appl. No. | 680,164 |
| [22] | Filed | Nov. 2, 1967 |
| [45] | Patented | Dec. 1, 1970 |
| [73] | Assignee | Ingersoll-Rand Company |
| | | New York, New York |
| | | a corporation of New Jersey |

[54] FLUID SEALING ARRANGEMENT
11 Claims, 5 Drawing Figs.
[52] U.S. Cl.............................................. 277/3,
  277/18, 277/28
[51] Int. Cl....................................... F16j 15/00,
  F16j 17/00
[50] Field of Search.......................... 277/3, 27,
  28, 18, 12, 15

[56] References Cited
UNITED STATES PATENTS

| 2,820,652 | 1/1958 | Oechslin.................... | 277/15 |
| 3,176,996 | 4/1965 | Barnett..................... | 277/3X |

FOREIGN PATENTS

| 324,763 | 2/1930 | Great Britain............. | 277/3 |
| 554,094 | 6/1943 | Great Britain............. | 277/15 |
| 285,560 | 9/1952 | Switzerland............... | 277/28 |

Primary Examiner—Samuel Rothberg
Attorneys—Carl R. Horten, David W. Tibbott and Bernard J. Murphy ABSTRACT: Fluid sealing elements with a pressure responsive chamber in communication therewith for automatically maintaining optimum pressure differential across said elements.

Patented Dec. 1, 1970
3,544,116
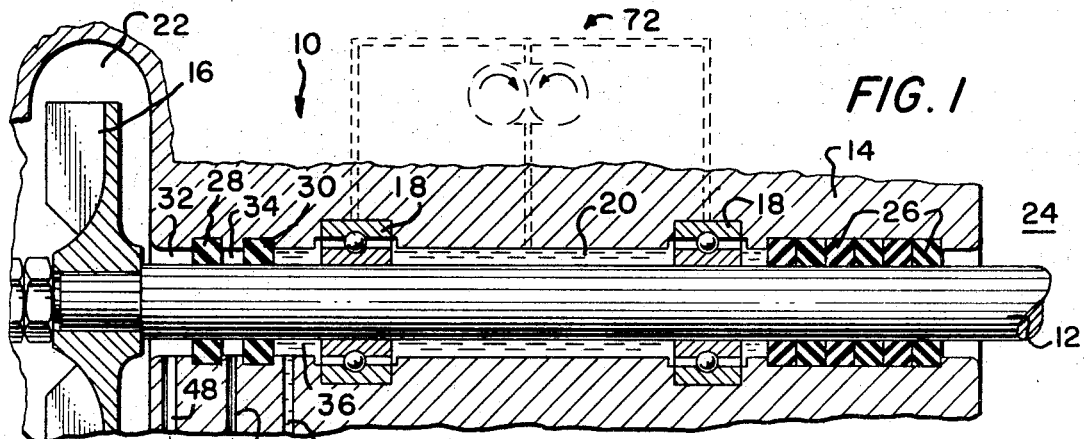
INVENTOR.
CARL R. PETERSON
BY
Bernard J. Murphy
AGENT

3,544,116

FLUID SEALING ARRANGEMENT

This invention pertains to sealing arrangements for pumping equipments, or the like, where fluid seals are required on the shafts thereof, and in particular for fluid sealing in applications involving toxic, radioactive, or other dangerous fluids requiring absolutely zero leakage to the atmosphere, and carefully controlled and wholly contained leakage past the seals. However, in its more simplified embodiment the invention can be advantageously applied to pumps used in the handling of less critical, innocuous fluids.

Absolutely zero leakage shaft seals of unquestionable reliability are difficult to produce. Hence, for handling dangerous fluids, "canned" drive pumps, i.e., pumps tolerant of leakage, but hermetically sealed from the ambient atmosphere, have been used. "Canned" drive pumps are not satisfactory in larger sizes, however. Accordingly, the larger pumps having seals which facilitate a carefully controlled leakage are coming into favor.

For pumping ordinary fluids, present controlled-leakage seals occupy considerable space between the impeller and the shaft bearings. Especially in single inlet, single stage pumps, but also in double inlet and multistage pumps, it is desirable, from a mechanical design point of view, to move the bearings closer to the impeller(s). This cannot be done with present controlled-leakage seals, while insuring judicious handling of the fractional leakage.

What is sought is a sealing arrangement with a limited axial dimension to accommodate proximity of the bearings to the impeller, and providing judicious handling of a controlled leakage. Such an arrangement, to satisfy these ends, must have some novel means for maintaining an optimum pressure differential across the sealing elements. It must have means for interdicting fluid flow from the ambient area to the critical fluid area, or it must have means for interdicting fluid flow in the direction opposite that just stated. Ideally, it would have both such interdicting means.

It is an object of this invention, therefore, to provide an improved sealing arrangement, occupying but a limited area axially of the shaft. Another object of this invention is to provide a sealing arrangement which defines a plurality of pressure chambers along the shaft, the chambers having an optimum pressure differential therebetween, with means for automatically maintaining said differential. Another object of this invention is to provide a sealing arrangement for a shaft with means for halting a leakage of fluid along the shaft in either axial direction. Another object of this invention is to provide a sealing arrangement disposed between the working area of the critical fluid and the working area of a lubricant fluid with means for interdicting the communication of one of said areas with the other.

A feature of this invention comprises the use of a pressure cell having variable volume chambers therein in communication with sealing elements.

Further objects and features of this invention will become more apparent by reference to the following description taken in conjunction with the figures in which:

FIG. 1 is a schematic diagram of the invention used with a pump having bearings entirely submerged in fluid lubricant;

FIG. 2 is a schematic diagram of a slightly simplified embodiment of the invention;

FIG. 3 is a schematic diagram of a very simplified embodiment intended for applications involving innocuous fluids very small leakages of which can be tolerated;

FIG. 4 is a schematic diagram of an embodiment of the invention which is a modification of that shown in FIG. 1 and arranged for application to nonsubmerged bearings.

Figure 5:
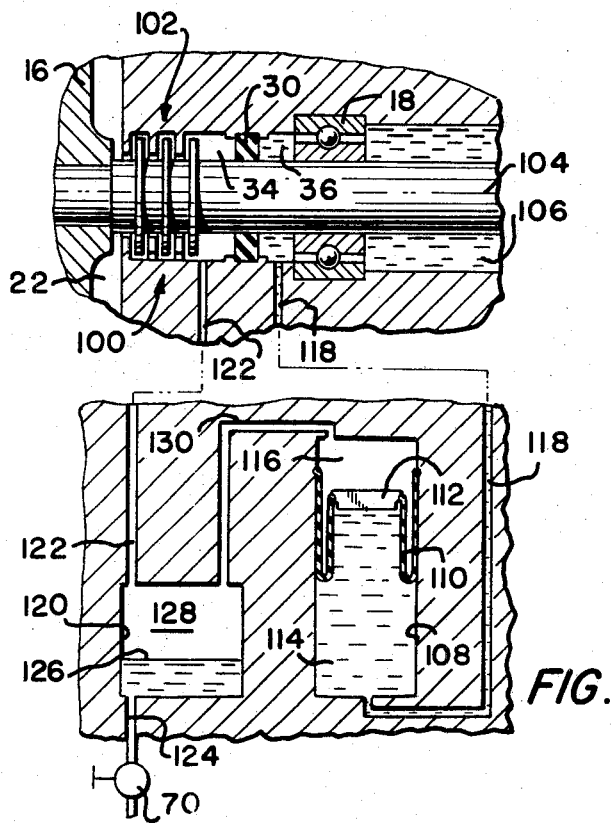
FIG. 5 is a schematic diagram of a simplified embodiment of the invention intended for applications involving gas as the critical fluid.

In FIG. 1, one embodiment of the fluid sealing arrangement 10, according to my invention, is shown in association with a shaft 12 in penetration of a housing 14. Shaft 12 mounts an impeller 16, or similar element for working the critical fluid, and is rotatably mounted in housing 14 by means of bearings 18. Bearings 18 are interposed in a lubricant annulus 20 formed of the spatial area between the shaft 12 and the housing 14. A portion of a pump chamber 22 is shown wherein impeller operates upon the critical fluid. The shaft 12 is exposed to the atmosphere 24 through the side of the housing 14 opposite the impeller 16. Along the atmospheric end of the shaft 12 conventional seals 26 are disposed.

According to my invention, sealing elements 28 and 30 are disposed in spaced relationship therebetween, and between shaft 12 and housing 14. Annular space 32, occurring between the inner or impeller end of housing 14 and sealing element 28, defines a first annular high-pressure chamber which is also the termination of the working area of the critical fluid. The space between sealing elements 28 and 30 defines an annular lower-pressure chamber 34. Finally a second annular high-pressure chamber 36 is defined by the spaces between sealing element 30 and the impeller side bearing 18. Second annular high-pressure chamber 36 is the termination of the working area of the lubricating fluid carried by annulus 20. Also shown in FIG. 1 is a chambered pressure cell 38 which may be formed in, or be external to, housing 14. Cell 38 is divided into first and second variable volume chambers 40 and 42 by means of a rolling diaphragm 44 which carries a weighted piston 46. Diaphragm 44 is fluid-sealed about the periphery thereof to the inner walls of cell 38 and carries piston 46 in fluid-sealing engagement centrally thereof. A conduit 48 which may be wholly formed in the housing 14, or may be, in part, external thereto, communicates chamber 40 with high-pressure chamber 32 by means of first high-pressure port 50. A lower-pressure port 52 communicates lower-pressure chamber 34 with second variable volume chamber 42.

The embodiment shown in FIG. 1 further includes a lubricant cell 54. Cell 54 also may be formed in, or be external to, housing 14 and the conduitry coupling with the same may be wholly or partly formed in housing 14. Cell 54 is also communicated with high-pressure chamber 32 by means of conduit 48 and second high-pressure port 56. Lubricant cell 54 is also chambered, forming third variable volume chamber 58 and fourth variable volume chamber 60 by means of a rolling diaphragm 62 which carries a weighted piston 64. Diaphragm 62 engages the walls of cell 54 and carries piston 64 in the same fluid-sealing manner as described for diaphragm 44. Chamber 60 functions as a reservoir for the fluid lubricant. A conduit 66 communicates variable volume chamber 60 with high-pressure chamber 36. A drain conduit 68 communicates variable volume chamber 42 with a drain valve 70 by means of which leaked fluid can be evacuated from the sealing arrangement. Finally, an oil circulation system 72, which is optional, is communicated with bearings 18 and annulus 20.

By way of explanation, pressure differences across sealing elements 28 and 30 will be maintained at very low values so that simple sealing elements will suffice.

The fluid pressure in the chamber 34 between the sealing elements 28 and 30 is controlled by communication with the pressure in chamber 32. As shown, conduit 48 leads the pressure of the critical fluid from the chamber 32 to the pressure cell 38. Within this cell 38, the weighted piston 46 and diaphragm 44 separate the critical fluid from the chamber 34. Due to the weight of the piston 46, and the effect thereof due to the force of gravity, the pressure in the chamber 34 is less than that in chamber 32. By selecting the appropriate weight, i.e., the weight per unit area, the pressure difference across sealing element 28 can be maintained at an optimum value.

As illustrated, the rolling diaphragm 44 coupled to the piston 46 provides an absolute seal between the chambers 40 and 42 of pressure cell 38. Some other positive seal device, such as a bellows or bladder, might also be used since the pressure difference across the seal is very small and piston motion is very slow.

Similarly, the pressure of chamber 32 communicates, through piston 64 to the lubricant adjacent to sealing element 30. In lubrication cell 54 the weighted piston 64 determines the lubricant pressure relative to the critical fluid pressure as established in chamber 32. As suggested by the illustration, a very light piston 64 provides a lubricant pressure practically equal to the critical fluid pressure. Accordingly, lubricant pressure in chamber 36 is controlled to be slightly greater than the pressure in chamber 34.

In operation, both the critical fluid and the lubricant fluid leak very slowly, by virtue of the arbitrarily low-pressure differences, past the seals 28 and 30 into chamber 34 where they are accumulated, via port 52, in chamber 42. From here the mixture of lubricant and pumped fluid is periodically drained off, via drain conduit 68 and valve 70, and disposed of in a safe manner. The frequency of this operation can be very low, depending on the leakage rates at sealing elements 28 and 30 and on the size of cell 38. Drainage of this material through the drain conduit 68 is very easily accomplished, without disturbance to the pump, since the fluid will be under pressure. As chamber 42 is drained, preferably slowly, the piston 46 simply rises as pumped fluid flows through conduit 48 to chamber 40. The pump need not be shut down. The periodic drainage could be performed automatically, using known servo mechanisms, if desired, using the motion of piston 46 to actuate the drain valve 70.

The pressure chamber 36, it is to be understood, will contain all ancillary shaft bearings; the details thereof are not shown, such arrangements being well known in the art and not being pertinent to the invention.

As shown, the lubrication system can include a circulating mechanism 72 if desired. However, the lubrication system is completely closed, so that whatever pressure differences may exist throughout the lubrication circuit, the pressure thereof in chamber 36 is maintained at the same level relative to the critical fluid pressure in chamber 32. Chamber 60 acts as an oil reservoir and changes in volume to accommodate expansion, contraction, and loss of lubricant, all the while maintaining the proper pressure relative to chamber 32. As lubricant is gradually lost more may be added to the system, by pumping it in with a hand pump for example, or by any other means (none of which are shown). An indicator coupled to piston 64, or any similar arrangement showing the position thereof, would act as a lubricant gauge, and such arrangements can be appended to my novel structure without departing from the spirit of my invention.

To seal the pressurized lubricant from the atmosphere 24, conventional seals 26 are provided. A blind shaft 12 would simply be capped with no additional seal. As seals 26 are not between the bearings 18 and the impeller 16, they can be of very generous dimensions with provision (not shown) for simple maintenance. Further, seals 26 act on simple, clean, cool lubricant so that no special problems develop thereat.

FIG. 2 illustrates a slightly simplified embodiment in which the pressure and lubricant cells 38 and 54, of FIG. 1, are combined into a composite, dual cell 74. Lubricant cell 54' is coextensive with pressure cell 38'. A single-termination conduit 48' communicates with both cells 38' and 54' via the common part 76.

It is to be noted that in this and in all embodiments of my invention as presented herein, in all cases, the proper pressure differentials are maintained independent of pump conditions. In particular, if the pump is shut down and the pressure of chamber 32 drops, all other pressures will also drop so that leakage of lubricant past seals 26 (FIG. 1) will not be a problem. Here, as in all the embodiments of my invention presented herein, no energy storage or power supply is required since gravity does the pressure regulations. Further, catastrophic failure of either sealing element 28 or 30 would result in no leakage of the dangerous fluid to atmosphere.

FIG. 3 shows a much simplified embodiment of the invention for applications where some slight leakage of pumped fluid or lubricant past the sealing arrangement can be tolerated. The double seal is replaced by a single sealing element 28 across which the pressures are balanced by a piston arrangement similar to those of FIGS. 1 and 2. In this, a sole pressure cell 78 is employed which carries the diaphragm 80 and weight 82. Conduitry 84 and 86 communicate opposite ends of cell 78 with chamber 32 and 36', respectively. Conduit 84 communicates chambers 88 and 32, and conduit 86 communicates chambers 90 and 36'.

In this embodiment, a slight pressure difference can be provided across the sealing element 28 in either axial direction (relative the shaft 12) to assure leakage in the least objectionable direction. As shown, chamber 88 is at slightly higher pressure than chamber 90, but by inverting cell 78 the pressure differential could be reversed. The advantage of this sealing arrangement is simply the mechanical one of providing for a short axial length between the bearings 18 (only one of which is shown) and the impeller 16, along with simple easily maintained external seals 26 (FIG. 1).

In all structural embodiments of my invention the weighted pistons could be assisted, or replaced, by spring devices, without departing from the spirit of my invention. For example, the natural spring characteristics of a bellows might be used to advantage. However, spring devices have the disadvantage of operating under varying conditions as the pistons change position.

The embodiment of FIG. 4 presents an arrangement of my invention useful in those applications which employ bearings which cannot be submerged in a liquid lubricant. In this embodiment a reservoir 92 is disposed adjacent the shaft bearings 18'. A lubricant level 94 is shown with a surmounting gas volume 96. The operation of this embodiment is the same as that given for the FIG. 1 embodiment. However, it is to be noted that conduit 66 of the FIG. 1 embodiment is supplanted by a conduit 98 which communicates chamber 60 with the gas volume 96. In this embodiment, provision must be made, by employment of any means well known in the art, for periodically adding makeup gas, for volume 96, as well as lubricant for reservoir 92.

As explained earlier, pressure differences across the sealing elements 28 and 30, in the FIGS. 1, 2, and 4 embodiments, will be at low values. In fact, by proper selection from known seals, it can easily be arranged to employ such seals as will define a chamber 34 in which the pressure of the critical fluid leaking therein, past sealing element 28, drops only slightly below the pressure of that fluid as established in chamber 32. Then my inventive arrangement would be very useful in pumps handling high-temperature fluids. The limited drop in pressure would avoid vaporization of the critical fluid leakage. Further, contrary to the known practice in conventional "wet seal" configurations, there would be no need to flush the seals with cooling fluid. By locating the chamber 42 remotely from the pump, it can be kept cool; accordingly, the collected leakage fluid will not flash to vapor when chamber 42 is drained. Finally, a conventional heat exchanger can be added to oil circulation system 72 to provide cooling for bearings 18.

The embodiment shown in FIG. 5 is a more simplified arrangement usable in applications involving gas as the critical fluid. In this structure the sealing element 28 used in the prior embodiments is supplanted by a labyrinth sealing arrangement 100. The labyrinth sealing arrangement occupies a first annular area or space 102 axially of shaft 104. Spaced therefrom is sealing element 30, and spaced from the latter is bearing 18. The intervening areas, then, are annular chambers 34 and 36. Annular area 106 comprises a lubrication space for the containment and circulation of a liquid lubricant, for instance, oil for bearing 18.

The pressure in chamber 34 will be identical to that in area 102; the labyrinth seal will be essentially open to the flow of gas, while preventing leakage of lubricant therethrough.

A pressure cell 108, similar to that of cell 74 in the FIG. 2 embodiment, serves as a reservoir for the lubricant, and maintains chamber 36 at a pressure slightly greater than the pressure in chamber 34. This is achieved by a similar diaphragm 110 and weighted piston 112 arrangement as disclosed for the prior embodiments. The cell reservoir 114 is sealed, by the diaphragm and piston arrangement, from a gas chamber 116.

Conduit 118 communicates the reservoir 114 with chamber 36.

In the embodiments presented in FIGS. 1 through 4, the drainage of leakage fluid is communicated to some unspecified area where it is disposed of in a safe manner. As an alternate, the FIG. 5 embodiment teaches the use of a separator tank, in the drain conduit, by means of which both leakage gas and fluid can be reclaimed and reemployed in the sealing system.

The separator tank 120 communicates with chamber 34 via conduit 122. The drainage fluid, being a mixture of the critical gas and the liquid lubricant is conveyed to the tank 120 where it freely separates. The lubricant collected in tank 120 will be at a pressure just slightly below that in chamber 36. Accordingly, if the oil is not contaminated, it can be reinjected into the lubricant system. The reinjection can be accomplished at the inlet of the circulating system (72, FIG. 1) or within given ones of seals 26 (FIG. 1) where, therebetween, the pressure obtaining is below that subsisting in area 106. Clearly, if the lubricant is contaminated due to the nature of the critical gas, it is drained from tank 120 and safely disposed of. Conduit 124 and valve 70 serve either of the aforementioned dispositions.

The lubricant level 126 defines thereabove a gas volume area 128 of tank 120. Conduit 130 communicates area 128 with chamber 116. Thus, conduits 122 and 130, together with area 128, serve the same purposes for pressure cell 108 as does conduit 48' and port 76 for cell 54' of the FIG. 2 embodiment.

Earlier it had been pointed out that the sealing elements 28 and 30 can be quite simple. If it is determined that sealing elements of the pumping type are to be used, their employment in my novel sealing arrangements can be easily accommodated. In that my novel sealing arrangements can be easily accommodated. In that pumping-type sealing elements require specified differential pressures, it remains only to select weighted pistons of complementary weights to achieve the requisite differential pressures.

As illustrated and discussed herein, my invention is applied to an impeller-type device, such as a pump, having a horizontally-disposed rotating shaft. However, as will be apparent to those skilled in the art, my invention can be employed in any device having an implement other than an impeller which works a fluid, i.e., rotors, pistons, sliding vanes, and the like. Also, my invention will function as well used with shafts which use nonliquid fluids as lubricants, and are vertically disposed, or inclined from the horizontal. Finally, my invention will serve axially-moved shafts no less than the rotary shafts depicted.

While I have described my invention in connection with specific embodiments thereof it is to be clearly understood that this is done only by way of example and not as a limitation to the scope of my invention as set forth in the objects thereof and in the accompanying claims.

I claim:

1. A sealing arrangement for a housing mounted shaft, comprising:
    means interposed between, and cooperating with the shaft and housing to establish a plurality of areas of variable and different pressure levels axially of the shaft;
    gravitational control means communicating with the areas of said plurality for automatically maintaining a given pressure differential between said areas, and for prohibiting the flow of fluid from one area of said plurality to another area thereof;
    wherein said control means comprise at least one extended chamber having either ends thereof communicating with distinct areas of said plurality, and means carried by said chamber for translating increasing fluid pressure communicated to one of said either ends into increasing fluid pressure communicated from the other of said either ends;
    said carried means comprise a planar member having the surfaces thereof disposed transverse to the longitudinal axis of said chamber;
    compliant means interposed between said planar member and the walls of said chamber; and
    said compliant means being fluid-sealed to said chamber walls and said planar member, and cooperative with the latter to sectionalize said chamber.

2. The invention, according to claim 1, wherein said planar member comprises a movable wall disposed for the communication of surfaces thereof with said areas, variations in said pressure levels being effective to move said wall in correspondence thereto.

3. The invention, according to claim 1, wherein said control means comprise a plurality of extended chambers, said chambers comprising variable volume chambers each of which has one of said planar members confined therein, said planar members being responsive to variations in pressure levels in said areas to alter the respective volumes of said chambers correspondingly.

4. The invention, according to claim 1, wherein:
    said one extended chamber comprises a first variable volume chamber; and
    further includes a second variable volume chamber in communication with an area of said plurality other than said distinct areas.

5. The invention, according to claim 1, wherein:
    said interposed means comprise a plurality of seals;
    said plurality of areas include an area having given pressure levels and an area having pressure levels lower than said given pressure levels; and
    either ends of said chamber communicate with one of said given and lower-pressure level areas.

6. The invention, according to claim 1, wherein said control means include means in communication with an area of said plurality for accumulating fluid leakage.

7. The invention, according to claim 6, further including means in communication with said accumulating means for draining fluid from the sealing arrangement.

8. The invention, according to claim 5, wherein each seal of said plurality separates one said given pressure area from one said lower pressure area, and tolerates fluid leakage therethrough, in cooperation with said control means, in only one direction.

9. The invention, according to claim 2, wherein said movable wall is disposed for movement thereof in response to gravitational force.

10. The invention, according to claim 1, wherein said control means include means in communication with an area of said plurality for accumulating fluid leakage, and for separating gaseous and liquid constituents thereof.

11. The invention, according to claim 10, wherein said control means further include means communicating said separating means with one said given pressure area.